UNITED STATES PATENT OFFICE.

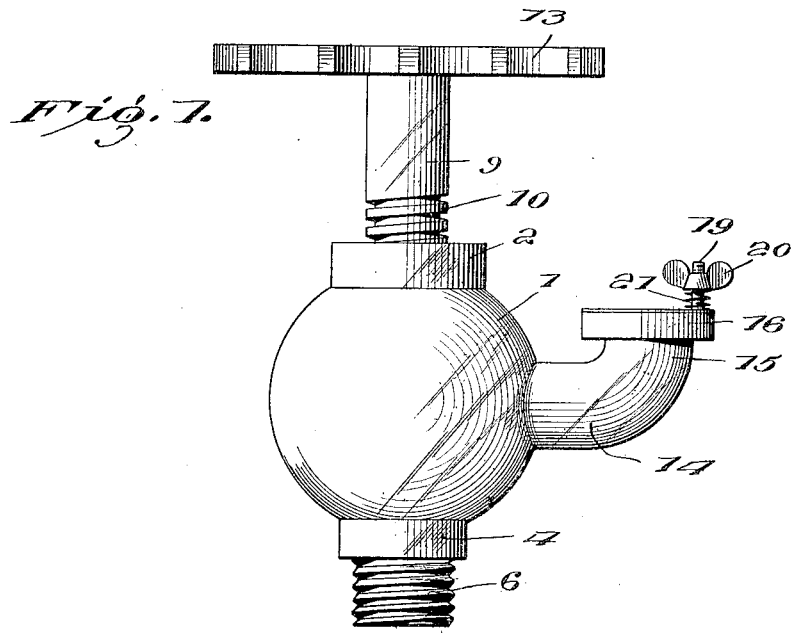
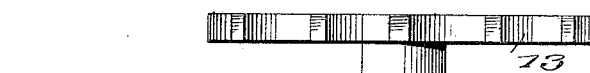
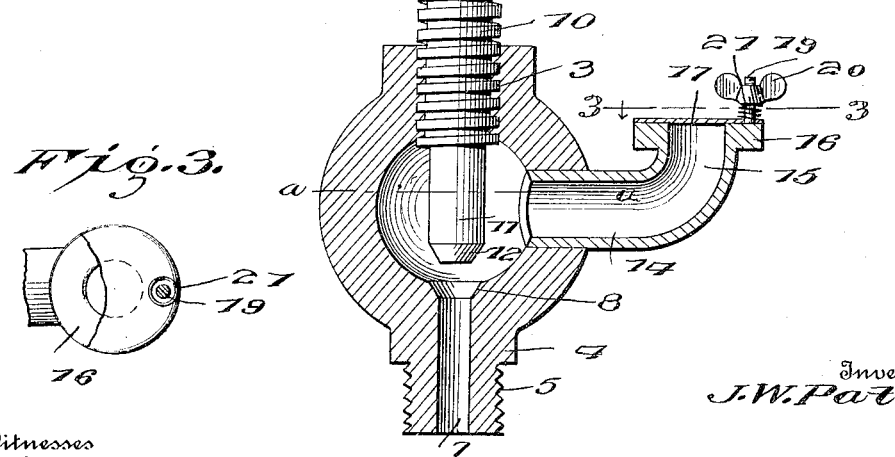

JAMES WILBORN PATE, OF JACKSON, TENNESSEE.

FILLING-VALVE FOR LUBRICATORS.

1,134,153.   Specification of Letters Patent.   Patented Apr. 6, 1915.

Application filed December 27, 1913. Serial No. 809,131.

*To all whom it may concern:*

Be it known that I, JAMES W. PATE, citizen of the United States, residing at Jackson, in the county of Madison and State of Tennessee, have invented certain new and useful Improvements in Filling-Valves for Lubricators, of which the following is a specification.

This invention relates to filling valves for lubricators and has as its object to provide a valve for this purpose so constructed that the lubricant may be readily introduced into its casing and delivered to the lubricator without likelihood of injury to the person using the valve either from escaping steam or from blowing out of the valve.

It is one aim of the invention to provide for the escape of steam through the valve casing at a point relatively remote from the valve handle and in a direction away from the operator's hands, the means provided being yieldable to pressure from within the casing.

In the accompanying drawings: Figure 1 is a side elevation of the valve embodying the present invention. Fig. 2 is a vertical sectional view therethrough. Fig. 3 is a horizontal section on the line 3—3 of Fig. 2.

Corresponding and like parts are referred to in the following description and indicated in all the views of the accompanying drawings by the same reference characters.

In the drawings, the valve casing is indicated by the numeral 1 and is preferably interiorly and exteriorly spherical, the casing being provided at its top with an integral boss 2 which is interiorly threaded, as indicated by the numeral 3 for a purpose to be presently explained. At its under side the casing is provided with a boss 4 which is reduced and exteriorly threaded, as at 5, to form a stem 6 which is to be securely threaded into the lubricator. The stem 6 is provided with an outlet bore 7 and at the upper end of the bore the casing is formed interiorly with a conical valve seat 8. The valve proper includes a stem 9 which is threaded a portion of its length, as indicated at 10, and has its said threaded portion adjustably fitting in the threaded opening in the boss 2 and the top of the casing. Below the threaded portion 10 the stem is reduced, as indicated at 11, and the extremity of the reduced portion 11 is turned down to conical form, as at 12, for coöperation with the seat 8. The stem is provided at its upper end with a handle 13 which may be of any suitable form and by grasping which the stem may be rotated whereby to adjust the valve toward or away from its seat 8 so as to close or open the outlet bore or passage 7 and thereby control the flow of lubricant from the casing 1 to the lubricator.

The valve casing is provided with a filling spout 14 having one end permanently secured in any suitable manner in one side of the casing 1 and extending laterally from the casing and thence upwardly curved, as at 15, and provided at its upper end with a circumscribing outstanding flange 16, the upper surface of which is plane. In connection with the upper end of the filling spout there is provided a closure which is yieldably held in place as will now be explained. The closure comprises a disk 17 of relatively thin material disposed to rest flat upon the upper side of the flange 16 in the manner clearly shown in Figs. 1 and 2 of the drawings. At one side this disk is provided with an opening 18 and a threaded stud 19 is secured to the flange 16 and projects upwardly therefrom and has threaded upon it a thumb nut 20. A spring 21 is fitted upon the stud and bears at its lower end against the upper side of the disk 17 and at its upper end against the nut, and it will be apparent that by rotating the nut the tension of the spring may be adjusted whereby to adapt the disk 17 to be lifted from its seat under excessive degrees of pressure within the valve casing. In using the filling valve, above described, its stem 6 is threaded into the lubricator and the handle 13 is rotated until the lower end of the stem 9 firmly engages the seat 8. The closure disk 17 may then be swung to one side upon the stud 19, as a pivot, and the lubricant may be poured into the filling spout until the valve casing is nearly filled, or more specifically, until the level of the lubricant is approximately at the dot and dash line $a$—$a$ in Fig. 2. The valve is then rotated to partly open position and the live steam will pass up through the passage 7 and through the lubricant whereby to equalize or substantially equalize the pressure within the lubricator and within the top of the valve casing above the surface of the lubricant. The lubricant will then be free to flow more or less rapidly from the passage 7 into the lurbicator. Should the pressure for any reason become abnormal, the filling valve will not be blown out, but, on the other hand, the disk 17 will be automatically lifted a sufficient distance and for a sufficient length of time to permit of the escape of live steam rising in the valve casing until the pressure is again equalized. It will be apparent from the foregoing that the disk 17 serves not only as a closure for the filling spout but also as a safety valve, and that any steam escaping around the edges of the disk will not be directed toward the handle 13 but, on the other hand, will be directed generally in a downward direction.

Having thus described the invention, what is claimed as new is.

1. In a filling valve for lubricators, a valve casing having a seat, a valve coöperating with the seat, a filling spout communicating with the casing, a closure disk disposed upon the end of the filling spout, means pivotally connecting the disk with the spout, and means yieldably bearing upon the disk whereby to yieldably hold the same in position closing the said spout.

2. In a filling valve for lubricators, a valve casing having a seat, a valve coöperating with the seat, a filling spout communicating with the casing and having an upwardly presented receiving end, a disk disposed upon the said end of the spout, a stud projecting through the said end of the spout and through an opening in the disk whereby to pivotally connect the disk with the said end of the spout, a spring fitted upon the stud and bearing upon the disk, and means for varying the tension of the said spring.

3. In a filling valve for lubricators, a valve casing provided in its bottom with a seat and having a stem provided with a passage communicating with the seat and with the interior of the casing, a valve having a stem threaded through the top of the casing, the said valve being arranged for coöperation with the said seat, a filling spout extending laterally from one side of the casing and having an upwardly presented filling end, a closure member disposed upon the said end and pivotally supported for movement slidable upon the said end of the spout into and out of position to close the spout, and means yieldably holding the said member to bear frictionally upon the said end of the spout.

4. In a filling valve for lubricators, a valve casing provided in its bottom with a seat and having a stem provided with a passage communicating with the seat and with the interior of the casing, a valve having a stem threaded through the top of the casing, the said valve being arranged for coöperation with said seat, a filling spout extending laterally from one side of the casing and thence upwardly, a threaded stud projecting upwardly from the upper end of the filling spout, a closure disk for the said end of the filling spout pivotally fitting the stud, a spring upon the stud bearing downwardly upon the said disk, and a nut threaded upon the stud and bearing against the upper end of the spring, the nut being adjustable upon the stud whereby to vary the tension of the spring.

In testimony whereof I affix my signature in presence of two witnesses.

JAS. WILBORN PATE.

Witnesses:
CLYDE C. RICHARDSON,
A. G. NORWOOD.

Copies of this patent may be obtained for five cents each, by addressing the "Commissioner of Patents, Washington, D. C."